(12) United States Patent
Froeschl et al.

(10) Patent No.: US 8,346,431 B2
(45) Date of Patent: Jan. 1, 2013

(54) ELECTRICAL SYSTEM OF A VEHICLE, PROVIDED FOR THE TOWING AWAY OF THE SAME

(75) Inventors: Joachim Froeschl, Herrsching (DE); Klaus Wandel, Munich (DE); Alexander Mai, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 988 days.

(21) Appl. No.: 12/361,191

(22) Filed: Jan. 28, 2009

(65) Prior Publication Data
US 2009/0132119 A1   May 21, 2009

Related U.S. Application Data

(63) Continuation of application No. PCT/EP2007/007403, filed on Aug. 23, 2007.

(30) Foreign Application Priority Data

Sep. 7, 2006   (DE) .......................... 10 2006 041 925

(51) Int. Cl.
*G06F 7/00* (2006.01)
*G05D 1/00* (2006.01)
*G05D 3/00* (2006.01)

(52) U.S. Cl. .................................. 701/36; 701/1; 701/45
(58) Field of Classification Search .......................... None
See application file for complete search history.

(56) References Cited

U.S. PATENT DOCUMENTS

| | | | |
|---|---|---|---|
| 3,970,860 A * | 7/1976 | Purdy | 340/477 |
| 4,017,136 A | 4/1977 | Sasgen | |
| 4,859,982 A * | 8/1989 | Seaburg | 340/475 |
| 5,698,905 A * | 12/1997 | Ruthlein et al. | 290/32 |
| 5,725,228 A * | 3/1998 | Livingston | 280/414.1 |
| 5,729,058 A * | 3/1998 | Groeller | 307/10.8 |
| 5,927,415 A * | 7/1999 | Ibaraki et al. | 180/65.25 |
| 6,793,034 B2 * | 9/2004 | Raftari et al. | 180/285 |
| 6,917,179 B2 * | 7/2005 | Komatsu et al. | 318/700 |
| 7,046,127 B2 * | 5/2006 | Boddy | 340/435 |
| 7,354,671 B2 * | 4/2008 | Ishikawa et al. | 429/432 |
| 7,406,370 B2 * | 7/2008 | Kojori et al. | 701/22 |
| 7,508,097 B2 * | 3/2009 | Furuta et al. | 307/328 |
| 2003/0038534 A1 * | 2/2003 | Barnett | 303/7 |
| 2003/0136597 A1 * | 7/2003 | Raftari et al. | 180/242 |

(Continued)

FOREIGN PATENT DOCUMENTS

DE   87 06 915 U1   12/1987

(Continued)

OTHER PUBLICATIONS

NPL—VND5012A Data Sheet—STMicroelectronics,2004.*

(Continued)

*Primary Examiner* — Ian Jen
(74) *Attorney, Agent, or Firm* — Crowell & Moring LLP

(57) ABSTRACT

A suitable electrical system for a motor vehicle is provided, which system requires a voltage supply during a possible towing-away operation. A voltage-supply control device recognizes the provision of an external voltage supply, in particular by way of a towing vehicle for the motor vehicle, and controls the voltage supply in the motor vehicle in such a manner that only one or more subsystems of the entire electrical system of the motor vehicle are supplied with voltage.

17 Claims, 1 Drawing Sheet

U.S. PATENT DOCUMENTS

| | | | |
|---|---|---|---|
| 2003/0141123 A1* | 7/2003 | Sugiura et al. | 180/65.2 |
| 2005/0006952 A1* | 1/2005 | Kohler et al. | 303/124 |
| 2005/0032404 A1* | 2/2005 | Furuta et al. | 439/157 |
| 2005/0077780 A1* | 4/2005 | Robertson | 303/7 |
| 2006/0085099 A1* | 4/2006 | Burlak et al. | 701/1 |
| 2006/0156096 A1* | 7/2006 | Sato | 714/724 |
| 2006/0187078 A1* | 8/2006 | Bell et al. | 340/815.4 |
| 2007/0176394 A1* | 8/2007 | Gehring et al. | 280/420 |
| 2007/0246276 A1* | 10/2007 | Moszoro et al. | 180/65.3 |
| 2007/0298313 A1* | 12/2007 | Iida | 429/49 |
| 2011/0102258 A1* | 5/2011 | Underbrink et al. | 342/357.47 |

FOREIGN PATENT DOCUMENTS

| | | |
|---|---|---|
| DE | 41 23 872 A1 | 1/1993 |
| DE | 101 03 907 A1 | 8/2002 |
| DE | 103 61 743 A1 | 9/2004 |

OTHER PUBLICATIONS

International Search Report dated Dec. 17, 2007 with English translation attached (four (4) pages).

German Office Action dated Jul. 12, 2007 with English translation of the relevant portion attached (nine (9) pages).

* cited by examiner

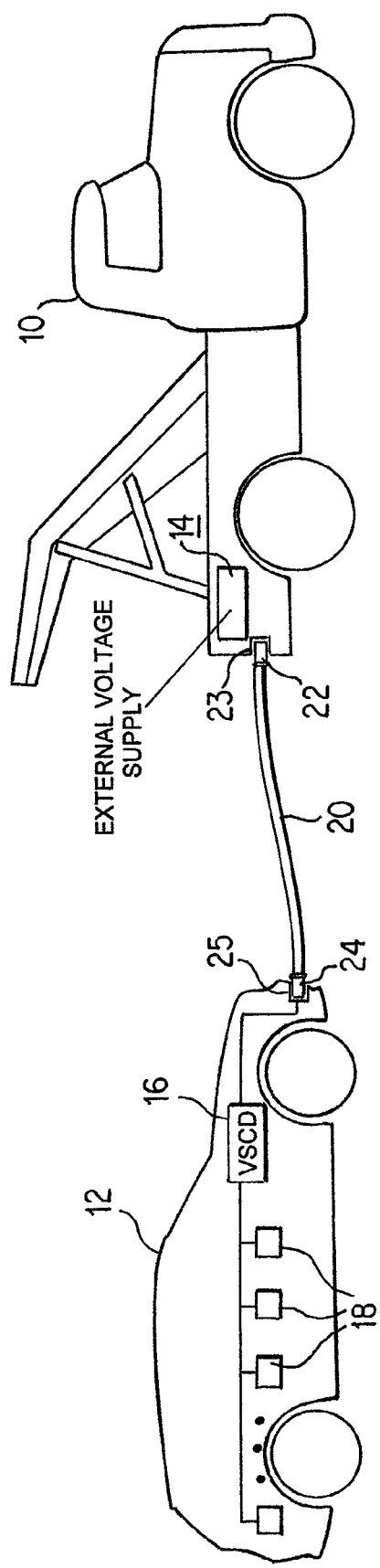

ELECTRICAL SYSTEM OF A VEHICLE, PROVIDED FOR THE TOWING AWAY OF THE SAME

CROSS-REFERENCE TO RELATED APPLICATIONS

This application is a continuation of PCT International Application No. PCT/EP2007/007403, filed Aug. 23, 2007, which claims priority under 35 U.S.C. §119 to German Patent Application No. DE 10 2006 041 925.1, filed Sep. 7, 2006, the entire disclosures of which are herein expressly incorporated by reference.

BACKGROUND AND SUMMARY OF THE INVENTION

The present invention relates to an electrical system of a motor vehicle.

Usually, only a tow bar or a tow rope is required for towing a vehicle. Likewise, an electrical connection between two vehicles in the form of a jumper cable is known, which serves to render a towing-away operation unnecessary. When a vehicle pulls a trailer, an electrical connection is also provided temporarily, in addition to a mechanical connection, for the voltage supply and control of a lighting system and direction indicator light mounted on the rear end of the trailer when the latter is being pulled.

It is the object of the invention to provide a suitable electrical system for a motor vehicle, which system requires a voltage supply during a possible towing operation.

According to the invention, an electrical system of a motor vehicle is provided, wherein a voltage-supply control device recognizes the provision of an external voltage supply, in particular by way of a towing vehicle for the motor vehicle, and controls the voltage supply in the motor vehicle such that only one or more subsystems of the entire electrical system of the motor vehicle (a subset of the subsystems) are supplied with voltage. Preferred embodiments of the invention are described herein.

An aspect of the invention involves supplementing the electrical system known from the prior art with a voltage-supply control device. The voltage supply control device recognizes the provision of an external voltage supply, in particular by way of a towing vehicle for the motor vehicle to be towed, and controls the voltage supply in the motor vehicle such that only one or more subsystems of the entire electrical system of the motor vehicle are supplied with voltage.

In this way, those components of the vehicle to be towed, the operation of which is necessary or meaningful during the towing-away operation of the vehicle, can be selectively supplied with voltage. The selective provision of an external voltage supply, instead of a mere electrical coupling of the electrical system of the towing vehicle with that of the vehicle to be towed, further reduces the risk of feeding electrical power into damaged vehicle components. This reduces the risk of short circuits and thus vehicle fires. Furthermore, the voltage supply of the towing vehicle is used only to the extent actually necessary for towing.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 is a schematic block diagram illustrating a motor vehicle having the electrical system according to the invention.

DETAILED DESCRIPTION OF THE DRAWING

Referring to FIG. 1, a schematic block diagram is provided illustrating a towing vehicle 10 configured for towing-away a towed vehicle 12. The towing vehicle 10 includes an external voltage supply 14 for supplying voltage to the towed vehicle 12. The electrical system of the vehicle 12 includes a voltage-supply control device (VSCD) 16, which recognizes the provision of a voltage supply from the external voltage supply 14. The voltage-supply control device 16 is operatively configured to control the voltage supply in the motor vehicle 12 in such a manner that only one or more subsystems 18 of the entire motor vehicle electrical system (a subset of the subsystems of the vehicle electrical system) are supplied with voltage.

In a particularly preferred embodiment of the invention, the voltage-supply control device 16 includes a program-controlled processor and a program control. The program control is formed in such a way that substantially only the electrical subsystems required for safely towing the vehicle 12 are supplied with voltage. The advantage of this combination of hardware and software is that this embodiment can be adapted with particular ease to various vehicle models and also various model versions. Only those components present in the concrete vehicle model or the concrete model version that are necessary in the towing-away operation and require electrical voltage supply for their operation can be selectively supplied with voltage.

In an embodiment of the invention, these components optionally include the steering, the brakes or the brake system, the lighting system, the clutch, the transmission system, the warning lights or direction indicator lights, and/or a hands-free car kit, and are supplied with voltage. This applies, in particular, to a vehicle equipped with a Drive-By-Wire system or a Steer-by-Wire system.

In an embodiment of the invention, a hands-free kit of the towing vehicle is coupled wirelessly or by wire to a hands-free kit of the towed vehicle, thus enabling the driver of the towing vehicle and the driver of the towed vehicle to communicate with each other during the towing-away operation. This enables coordination processes between the two drivers, in particular, when braking and turning during the towing-away operation, which greatly increases the safety of road traffic.

In a further embodiment of the invention, an electrical connection for the voltage supply of the towed vehicle by the towing vehicle is produced between the towing vehicle and the towed vehicle. This is preferably effected in the form of a flexible electrical cable 20, which has a plug 22, 23 on each of its two ends. The plug is inserted into a corresponding socket 24, 25 of the towing vehicle and the towed vehicle.

If the electrical connection between the two vehicles is broken during the towing-away operation by an interruption in the tow rope, and consequently the electrical connection, the electrical connection between the socket of the towing vehicle and the electrical system of the towing vehicle is preferably electrically isolated. If appropriate, the electrical connection between the socket of the towed vehicle and the electrical system of the towed vehicle can likewise be electrically isolated. Furthermore, a cut-off switch or isolation may be provided if there is a short-circuit current or an excessively high current in the connecting cable. These measures enable a distinct further reduction in the risk of short circuits and thus of vehicle fires. Furthermore, provision may be made for the two drivers to receive instructions from the electrical system of the invention, e.g., by way of a corresponding warning on a display in the vehicle in the case of a breakdown in the electrical connection during the towing-away operation.

In a further preferred embodiment of the invention, the headlights and/or the hazard warning lights of the vehicle are switched on automatically when the towed vehicle is externally supplied with voltage. This automatically also increases road traffic safety.

In a development of the invention, the towed vehicle is provided with a voltage converter, which converts higher or lower electrical voltage provided by the towing vehicle into a voltage that needs to be provided in the electrical subsystems requiring voltage supply during the towing-away operation. This increases the flexibility and possible combinations of towing vehicles and vehicles to be towed. This is especially significant in the future when vehicles will be provided with multi-voltage electrical systems.

In a further embodiment of the invention, the air-conditioning system of the towed vehicle cools the same when a predefined internal temperature in the towed vehicle is exceeded. By virtue of the fact that the external voltage supply by the towing vehicle enables the operation of the air-conditioning system of the towed vehicle, the driver of the towed vehicle is relieved of discomfort caused by high temperatures in the interior of the towed vehicle, thereby increasing safety during the towing-away operation. If the air-conditioning system in the towed vehicle is supplied with voltage by means of a fuel cell, the latter can be automatically put into operation, if necessary, during the towing-away operation without any requirement of an external voltage supply for this purpose.

In a preferred embodiment, the electrical system of the invention is provided with a battery-state monitoring device. This device uses predefined criteria to determine whether the vehicle intended to serve as the towing vehicle is able to supply a towed vehicle with electrical voltage. In a development of the invention, the battery-state monitoring device provides a corresponding warning to the driver if the battery does not have sufficient power, and does not provide an electrical voltage supply for the vehicle to be towed even if the towing vehicle were able to do the same for a short period of time. Otherwise, the towing vehicle itself could break down or not function reliably. These measures thus likewise increase road traffic safety.

In an embodiment of the invention, the electrical system is provided in hybrid vehicles, which in any event presumably have to be coupled with an external voltage supply during the towing-away operation due to their electrical architecture.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrical system of a motor vehicle, comprising:
   a voltage-supply control device operatively configured to recognize provision of an external voltage supply during a tow operation of the motor vehicle;
   a voltage supply in the motor vehicle which is controllable by the voltage-supply control device;
   a plurality of electrical subsystems of the motor vehicle coupled to the voltage-supply control device; and
   wherein the voltage-supply control device, in response to detecting provision of the external voltage supply, selectively controls the voltage supply in the motor vehicle such that only a subset of the plurality of electrical subsystems of the motor vehicle that are coupled to the voltage-supply control device are supplied with voltage during said tow operation, and wherein at least one of headlights and hazard warning lights of the motor vehicle are automatically switched on when the motor vehicle is supplied with voltage from the external voltage supply.

2. The electrical system according to claim 1, wherein the voltage-supply control device comprises a programmable processor, wherein the programmable processor is programmed such that substantially only the subset of electrical subsystems required for a safe towing of the motor vehicle are supplied with voltage.

3. The electrical system according to claim 1, wherein the subset of electrical subsystems comprise at least one of a steering system, a brake or brake system, a lighting system, a clutch, a transmission system, warning or direction indicator lights, and a hands-free car kit.

4. The electrical system according to claim 2, wherein the subset of electrical subsystems comprise at least one of a steering system, a brake or brake system, a lighting system, a clutch, a transmission system, warning or direction indicator lights, and a hands-free car kit.

5. The electrical system according to claim 3, wherein the subset of electrical subsystems are supplied with voltage in a drive-by-wire system in the motor vehicle.

6. The electrical system according to claim 3, wherein the hands-free kit of the motor vehicle is coupled to a hands-free kit of a towing vehicle, said coupling enabling a driver of the towing vehicle and a driver of the motor vehicle to communicate with one another during a towing-away operation.

7. The electrical system according to claim 1, further comprising a flexible electrical cable having a plug on each end, wherein an electrical connection for the voltage supply from the external voltage supply to the voltage-supply control device is provided by way of the flexible electrical cable, said cable being inserted into a corresponding socket of the motor vehicle and a corresponding socket of a towing vehicle providing the external voltage supply.

8. The electrical system according to claim 2, wherein the programmable processor is operatively configured to ensure a voltage supply during a towing-away operation to at least one of an electrical steering system, electrical brakes, and an emergency call device installed in the motor vehicle.

9. The electrical system according to claim 1, further comprising a voltage converter provided in the motor vehicle, the voltage converter converting a higher or lower electrical voltage provided by the external voltage supply into a voltage required by the subset of electrical subsystems of the motor vehicle to be supplied with voltage.

10. The electrical system according to claim 1, further comprising an air-conditioning system of the motor vehicle, the air-conditioning system being operatively configured to cool the motor vehicle when a predefined internal temperature in the motor vehicle is exceeded.

11. The electrical system according to claim 1, further comprising a battery-state monitoring device, said battery-state monitoring device being operatively configured to determine whether the motor vehicle is able to supply a towed vehicle with electrical voltage based upon predefined criteria.

12. The electrical system according to claim 11, wherein the battery-state monitoring device provides a corresponding warning to a driver if a battery of the motor vehicle does not have sufficient power, in which case the battery does not provide an electrical voltage supply for the vehicle to be towed.

13. The electrical system according to claim 1, wherein the motor vehicle is a hybrid vehicle comprising an internal combustion engine, an electric motor, a battery, and an additional energy store comprising a double-layer capacitor.

14. An electrical system of a motor vehicle, comprising:
a voltage-supply control device operatively configured to recognize provision of an external voltage supply during a tow operation of the motor vehicle;
a voltage supply in the motor vehicle which is controllable by the voltage-supply control device;
a plurality of electrical subsystems of the motor vehicle coupled to the voltage-supply control device; and
wherein the voltage-supply control device, in response to detecting provision of the external voltage supply, selectively controls the voltage supply in the motor vehicle such that only a subset of the plurality of electrical subsystems of the motor vehicle that are coupled to the voltage-supply control device are supplied with voltage during said tow operation, and
wherein the subset of electrical subsystems comprise at a hands-free car kit, and wherein the hands-free kit of the motor vehicle is coupled to a hands-free kit of a towing vehicle, said coupling enabling a driver of the towing vehicle and a driver of the motor vehicle to communicate with one another during a towing-away operation.

15. The electrical system according to claim 14, wherein the voltage-supply control device comprises a programmable processor, wherein the programmable processor is programmed such that substantially only the subset of electrical subsystems required for a safe towing of the motor vehicle are supplied with voltage.

16. An electrical system of a motor vehicle, comprising:
a voltage-supply control device operatively configured to recognize provision of an external voltage supply during a tow operation of the motor vehicle;
a voltage supply in the motor vehicle which is controllable by the voltage-supply control device;
a plurality of electrical subsystems of the motor vehicle coupled to the voltage-supply control device, wherein the voltage-supply control device, in response to detecting provision of the external voltage supply, selectively controls the voltage supply in the motor vehicle such that only a subset of the plurality of electrical subsystems of the motor vehicle that are coupled to the voltage-supply control device are supplied with voltage during said tow operation; and
a battery-state monitoring device operatively configured to provide a corresponding warning to a driver if a battery of the motor vehicle does not have sufficient power, in which case the battery does not provide an electrical voltage supply for the vehicle to be towed.

17. The electrical system according to claim 16, wherein the voltage-supply control device comprises a programmable processor, wherein the programmable processor is programmed such that substantially only the subset of electrical subsystems required for a safe towing of the motor vehicle are supplied with voltage.

* * * * *